(12) United States Patent
Kachi et al.

(10) Patent No.: US 8,198,836 B2
(45) Date of Patent: Jun. 12, 2012

(54) HYBRID VEHICLE AND METHOD OF CONTROLLING HYBRID VEHICLE

(75) Inventors: Tadayoshi Kachi, Obu (JP); Hiroaki Ono, Tokoname (JP)

(73) Assignees: Toyota Jidosha Kabushiki Kaisha, Toyota (JP); Kabushiki Kaisha Toyota Jidoshokki, Kariya (JP); Denso Corporation, Kariya (JP)

( * ) Notice: Subject to any disclaimer, the term of this patent is extended or adjusted under 35 U.S.C. 154(b) by 809 days.

(21) Appl. No.: 12/289,593

(22) Filed: Oct. 30, 2008

(65) Prior Publication Data

US 2009/0115358 A1    May 7, 2009

(30) Foreign Application Priority Data

Nov. 6, 2007 (JP) ................................. 2007-288321

(51) Int. Cl.
*B60K 6/00* (2007.10)
*B60L 11/08* (2006.01)
*H02P 7/00* (2006.01)
*H02P 25/30* (2006.01)

(52) U.S. Cl. ..................... 318/139; 318/140; 180/65.31; 180/65.285; 903/902

(58) Field of Classification Search .................. 318/139, 318/140, 150, 151, 41, 77, 85, 801; 363/71, 363/41, 56.02, 97, 132; 903/902; 322/29, 322/89, 44, 90; 180/65.31, 65.285, 65.275, 180/65.225; 290/40 C, 4 A, 4 C, 4 R; 701/22
See application file for complete search history.

(56) References Cited

U.S. PATENT DOCUMENTS

| | | | | | |
|---|---|---|---|---|---|
| 5,414,339 | A | * | 5/1995 | Masaki et al. | 318/800 |
| 5,712,540 | A | * | 1/1998 | Toda et al. | 318/46 |
| 6,486,632 | B2 | * | 11/2002 | Okushima et al. | 318/599 |
| 7,023,171 | B2 | * | 4/2006 | Su et al. | 318/400.26 |
| 7,379,313 | B2 | * | 5/2008 | Yaguchi | 363/98 |
| 7,462,944 | B2 | * | 12/2008 | Holl et al. | 290/1 R |
| 7,764,051 | B2 | * | 7/2010 | Ishikawa et al. | 322/29 |
| 7,941,254 | B2 | * | 5/2011 | Mitsutani | 701/22 |

(Continued)

FOREIGN PATENT DOCUMENTS

JP    2000142134 A * 5/2000

(Continued)

*Primary Examiner* — Eduardo Colon Santana
(74) *Attorney, Agent, or Firm* — Oliff & Berridge, PLC

(57) ABSTRACT

A hybrid vehicle includes a power generator that generates electric power using power from an internal combustion engine; a motor that outputs power for travel of the hybrid vehicle; a first inverter connected to an electric power storage device and the motor to drive the motor; a second inverter connected to the electric power storage device; and a large drive power determination portion that determines whether the hybrid vehicle is in a large-drive-power required state in which drive power equal to or larger than a predetermined value is required for the travel of the hybrid vehicle. When it is determined that the hybrid vehicle is not in the large-drive-force required state, the second inverter is connected to the power generator. When it is determined that the hybrid vehicle is in the large-drive-force required state, the second inverter is connected to the motor.

15 Claims, 3 Drawing Sheets

U.S. PATENT DOCUMENTS

| | | | |
|---|---|---|---|
| 7,956,584 B2 * | 6/2011 | Peterson et al. | 322/44 |
| 8,008,876 B2 * | 8/2011 | Yonemori et al. | 318/151 |
| 2002/0027789 A1 * | 3/2002 | Okushima et al. | 363/41 |
| 2007/0120520 A1 * | 5/2007 | Miyazaki et al. | 318/801 |
| 2007/0289794 A1 * | 12/2007 | Ishikawa et al. | 180/165 |
| 2008/0157594 A1 * | 7/2008 | Peterson et al. | 307/10.1 |
| 2009/0033251 A1 * | 2/2009 | Perisic et al. | 318/105 |
| 2009/0309537 A1 * | 12/2009 | Saito | 320/101 |
| 2010/0156172 A1 * | 6/2010 | Pugsley et al. | 307/9.1 |
| 2010/0242481 A1 * | 9/2010 | Shamoto et al. | 60/698 |
| 2010/0256851 A1 * | 10/2010 | Mitsutani | 701/22 |
| 2011/0190971 A1 * | 8/2011 | Severinsky et al. | 701/22 |

FOREIGN PATENT DOCUMENTS

| | | |
|---|---|---|
| JP | B2-3463791 | 8/2003 |
| WO | WO 2010151775 A1 * | 12/2010 |

* cited by examiner

# HYBRID VEHICLE AND METHOD OF CONTROLLING HYBRID VEHICLE

INCORPORATION BY REFERENCE

The disclosure of Japanese Patent Application No. 2007-288321 filed on Nov. 6, 2007 including the specification, drawings and abstract is incorporated herein by reference in its entirety.

BACKGROUND OF THE INVENTION

1. Field of the Invention

The invention relates to a hybrid vehicle and a method of controlling the hybrid vehicle.

2. Description of the Related Art

For example, Japanese Patent No. 3463791 describes a hybrid vehicle that includes an engine, an alternating-current generator connected to the engine, an alternating-current motor that drives the vehicle, and an inverter that drives the alternating-current motor. In the hybrid vehicle, if the inverter malfunctions, the alternating-current generator is connected directly to the alternating-current motor so that a three-phase alternating current generated by the alternating-current generator is applied to the alternating-current motor, and thus, the alternating-current motor is driven.

In general, in the hybrid vehicle that includes a power generator that generates electric power using power from an internal combustion engine, and a motor that outputs power for travel of the vehicle, inverters are provided to drive the power generator and the motor, respectively; the inverter for the power generator can receive the rated maximum output of the power generator; and the inverter for the motor can supply the electric power corresponding to the rated maximum output of the motor. When the vehicle is suddenly started, or when the vehicle is started, on an upward slope although the vehicle is not suddenly started, the inverter for the motor is controlled so that the motor outputs large drive power. When the vehicle normally travels while the vehicle is gradually accelerated or decelerated, large drive power is not required, and therefore, the inverter for the motor is controlled so that the motor generates drive power that is much lower than the rated maximum output. Thus, the inverter for driving the motor for travel of the vehicle is required to have high output performance that is unnecessary when the vehicle normally travels.

SUMMARY OF THE INVENTION

The invention relates to a hybrid vehicle in which a motor for travel of the hybrid vehicle is driven using an inverter with low performance.

A first aspect of the invention relates to a hybrid vehicle that includes an internal combustion engine; a power generator that generates electric power using power from the internal combustion engine; a motor that outputs power for travel of the hybrid vehicle; an electric power storage device which is charged with the electric power, and from which the electric power is discharged; a first inverter that is connected to the electric power storage device and the motor, and that drives the motor; a second inverter connected to the electric power storage device; a connection switching device that switches a connection state of the second inverter between a connection state in which the second inverter is connected to the power generator, and a connection state in which the second inverter is connected to the motor; a required drive power setting portion that sets required drive power required for the travel of the hybrid vehicle; a large drive power determination portion that determines whether the hybrid vehicle is in a large-drive-power required state in which drive power equal to or larger than a predetermined value is required for the travel of the hybrid vehicle; and a control device which controls the internal combustion engine, the first inverter, the second inverter, and the connection switching device so that the hybrid vehicle travels using the set required drive power while the second inverter is connected to the power generator, when the large drive power determination device determines that the hybrid vehicle is not in the large-drive-power required state, and which controls the internal combustion engine, the first inverter, the second inverter, and the connection switching device so that the hybrid vehicle travels using the set required drive power while the second inverter is connected to the motor, when the large drive power determination device determines that the hybrid vehicle is in the large-drive-power required state.

With the above-described configuration, when it is determined that the hybrid, vehicle is not in the large-drive-power required state, the hybrid vehicle travels using the required drive power, while the power generator generates the electric power using the power from the internal combustion engine. When it is determined that the hybrid vehicle is in the large-drive-power required state, the motor is driven using the first inverter and the second inverter so that the hybrid vehicle travels using the required drive power. Thus, the motor outputs large drive power, as compared to when the motor is driven by only the first inverter. In this case, it is not possible to generate electric power using the power from the internal combustion engine. Thus, by switching the connection state of the second inverter according to the drive power required for the travel of the hybrid vehicle, it is possible to drive the motor using the first inverter that has lower performance than that of an inverter that can supply, by itself, the electric power corresponding to the rated maximum output of the motor.

In the hybrid vehicle according to the above-described aspect, when the large drive power determination portion determines that the hybrid vehicle is in the large-drive-power required state, the control device may control the first inverter so that a three-phase alternating current is applied from the first inverter to the motor, and control the second inverter so that a three-phase alternating current is applied from the second inverter to the motor.

In the hybrid vehicle according to the above-described aspect, the control device may control the internal combustion engine, the first inverter, the second inverter, and the connection switching device so that phases of the three-phase alternating current applied from the first inverter to the motor are the same as phases of the three-phase alternating current applied from the second inverter to the motor.

In the hybrid vehicle according to the above-described aspect, when the hybrid vehicle is started, the large drive power determination portion may determine that the hybrid vehicle is in the large-drive-power required state. When a road gradient is equal to or larger than a predetermined gradient, the large drive power determination portion may determine that the hybrid vehicle is in the large-drive-power required state.

In the hybrid vehicle according to the above-described aspect, the first inverter may be electrically connected to the electric power storage device and the motor, and the second inverter may be electrically connected to the electric power storage device; when the second inverter is connected to the power generator, the second inverter may be electrically connected to the power generator; and when the second inverter is connected to the motor, the second inverter may be electrically connected to the motor.

A second aspect of the invention relates to a method of controlling a hybrid vehicle that includes an internal combustion engine; a power generator that generates electric power using power from the internal combustion engine; a motor that outputs power for travel of the hybrid vehicle; an electric power storage device which is charged with the electric power, and from which the electric power is discharged; a first inverter that is connected to the electric power storage device and the motor, and that drives the motor; a second inverter connected to the electric power storage device; and a connection switching device that switches a connection state of the second inverter between a connection state in which the second inverter is connected to the power generator, and a connection state in which the second inverter is connected to the motor. The method includes determining whether the hybrid vehicle is in a large-drive-power required state in which drive power equal to or larger than a predetermined value is required for the travel of the hybrid vehicle; and controlling the internal combustion engine, the first inverter, the second inverter, and the connection switching device so that the hybrid vehicle travels using required drive power required for the travel of the hybrid vehicle while the second inverter is connected to the power generator, when it is determined that the hybrid vehicle is not in the large-drive-power required state; and controlling the internal combustion engine, the first inverter, the second inverter, and the connection switching device so that the hybrid vehicle travels using the required drive power required for the travel of the hybrid vehicle while the second inverter is connected to the motor, when it is determined that the hybrid vehicle is in the large-drive-power required state.

With the above-described configuration, when it is determined that the hybrid vehicle is not in the large-drive-power required state, the hybrid vehicle travels using the required drive power while the power generator generates the electric power using the power from the internal combustion engine. When it is determined that the hybrid vehicle is in the large-drive-power required state, the motor is driven using the first inverter and the second inverter so that the hybrid vehicle travels using the required drive power. Thus, the motor outputs large drive power, as compared to when the motor is driven by only the first inverter. In this case, it is not possible to generate electric power using the power from the internal combustion engine. Thus, by switching the connection state of the second inverter according to the drive power required for the travel of the hybrid vehicle, it is possible to drive the motor using the first inverter that has lower performance than that of an inverter that can supply, by itself, the electric power corresponding to the rated maximum output of the motor.

In the method according to the above-described aspect, when it is determined that the hybrid vehicle is in the large-drive-power required state, the internal combustion engine, the first inverter, the second inverter, and the connection switching device may be controlled so that a three-phase alternating current is applied from the first inverter to the motor, a three-phase alternating current is applied from the second inverter to the motor, and phases of the three-phase alternating current applied from the first inverter to the motor are the same as phases of the three-phase alternating current applied from the second inverter to the motor.

The method according to the above-described aspect may further include detecting an amount of charge of the electric power storage device; and applying the three-phase alternating current from the second inverter to the motor, when it is determined that the hybrid vehicle is in the large-drive-power required state, and the amount of charge is larger than a predetermined amount.

The method according to the above-described aspect may further include stopping the internal combustion engine, when it is determined that the hybrid vehicle is in the large-drive-power required state, and the amount of charge is larger than the predetermined amount.

In the method according to the above-described aspect, the method of controlling the hybrid vehicle may be repeatedly executed at predetermined time intervals.

A third aspect of the invention relates to a hybrid vehicle that includes an internal combustion engine; a power generator that generates electric power using power from the internal combustion engine; a motor that outputs power for travel of the hybrid vehicle; an electric power storage device which is charged with the electric power, and from which the electric power is discharged; a first inverter that is electrically connected to the electric power storage device and the motor, and that drives the motor; a second inverter electrically connected to the electric power storage device; and a connection switching device that switches a connection state of the second inverter between a connection state in which the second inverter is electrically connected to the power generator, and a connection state in which the second inverter is electrically connected to the motor.

In the hybrid vehicle according to the above-described aspect, when the second inverter is electrically connected to the electric power storage device and the motor, the first inverter may be electrically connected to the electric power storage device and the motor.

The hybrid vehicle according to the above-described aspect may further include a large drive power determination portion that determines whether drive power equal to or larger than a predetermined value is required for the travel of the hybrid vehicle; and a control device which controls the connection switching device so that the second inverter is electrically connected to the power generator, when the large drive power determination device determines that the hybrid vehicle is not in the large-drive-power required state, and which controls the connection switching device so that the second inverter is electrically connected to the motor, when the large drive power determination device determines that the hybrid vehicle is in the large-drive-power required state.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Next, an embodiment of the invention will be described.

Figure 1:
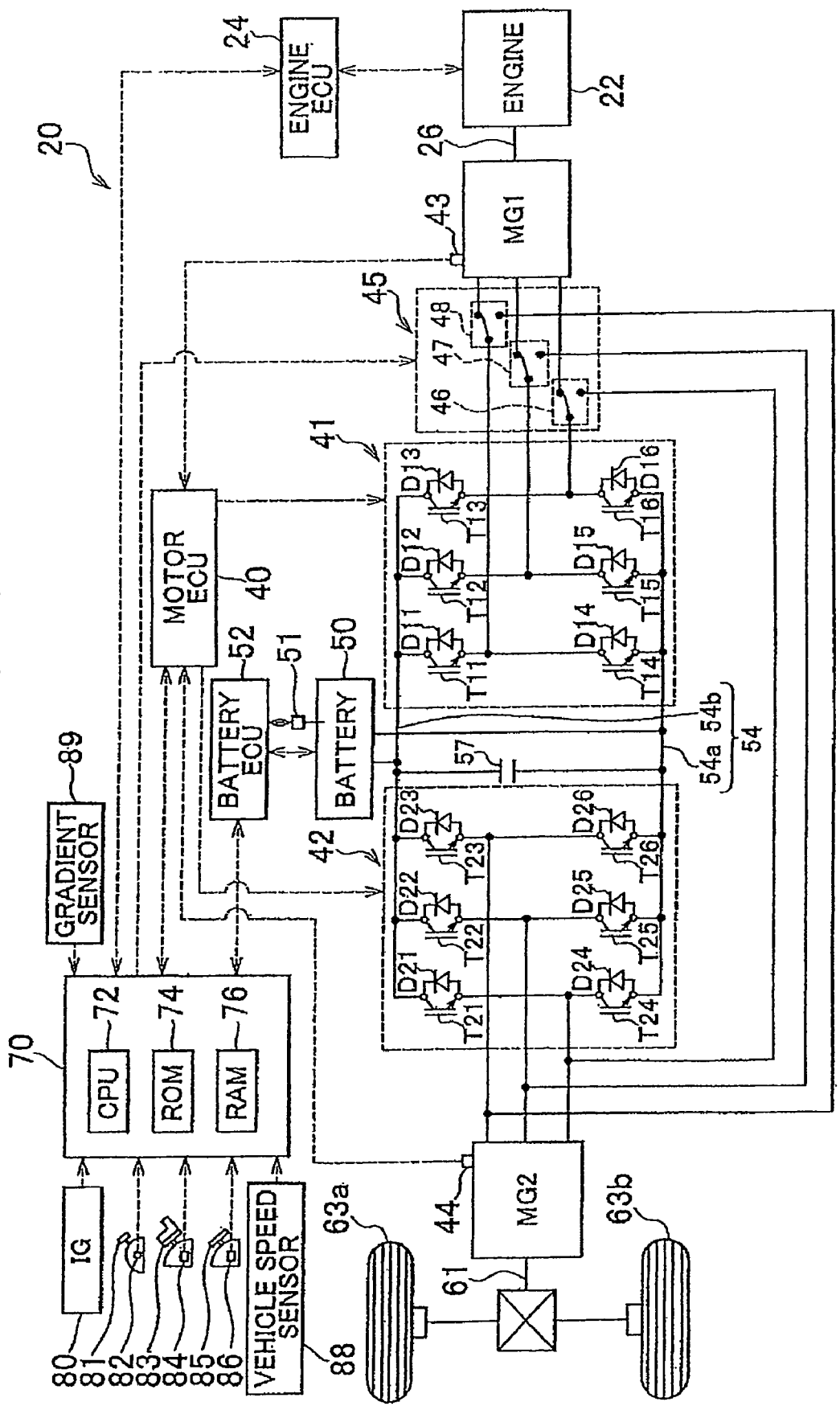
FIG. 1 is a diagram schematically showing a configuration of a hybrid vehicle according to an embodiment of the invention.

FIG. 1 is a diagram schematically showing a configuration of a hybrid vehicle 20 according to the embodiment of the invention. As shown in FIG. 1, the hybrid vehicle 20 according to the embodiment includes, an engine 22; a motor MG1 that generates electric power using power from the engine 22;

a motor MG2 that outputs power to drive wheels 63a and 63b; a battery 50 which is charged with the electric power, and from which the electric power is discharged; a first inverter 41 connected to the battery 50; a second inverter 42 connected to the battery 50 to drive the motor MG2; a switch 45 that connects the first inverter 41 to the motor MG1 or the motor MG2; and a hybrid electronic control unit 70 that controls the entire hybrid vehicle 20.

The engine 22 is an internal combustion engine that outputs power using hydrocarbon fuel such as gasoline or light oil. An engine electronic control unit (hereinafter, referred to as "engine ECU") 24 executes operating controls for the engine 22, such as a fuel injection control, an ignition control, and an intake air amount adjustment control. The engine ECU 24 receives signals from sensors that detect the operating state of the engine 22. For example, the engine ECU 24 receives a signal indicating a crank position from a crank position sensor (not shown) that detects a crank angle of a crankshaft 26 of the engine 22. The engine ECU 24 communicates with the hybrid electronic control unit 70. The engine ECU 24 controls the engine 22 according to a control signal from the hybrid electronic control unit 70. In addition, the engine ECU 24 outputs data concerning the operating state of the engine 22, to the hybrid electronic control unit 70 as needed. The engine ECU 24 calculates a rotational speed of the crankshaft 26, that is, a rotational speed Ne of the engine 22, based on the crank position received from the crank position sensor (not shown).

Each of the motor MG1 and the motor MG2 is configured as a known synchronous generator/motor that includes a rotor and a stator. A permanent magnet is attached to an outer surface of the rotor. Three-phase coils are wound around the stator. Electric power is exchanged between the motors MG1 and MG2 and the battery 50 through the first and second inverters 41 and 42. The first inverter 41 includes six transistors T11 to T16, and six diodes D11 to D16 that are connected in inverse parallel with the transistors T11 to T16, respectively. The second inverter 42 includes six transistors T21 to T26, and six diodes D21 to D26 that are connected in inverse parallel with the transistors T21 to T26, respectively. The transistors T11 to T16 are disposed to form three pairs of a source-side transistor and a sink-side transistor with respect to a positive electrode bar 54a connected to a positive electrode of the battery 50, and a negative electrode bar 54b connected to a negative electrode of the battery 50. The transistors T21 to T26 are disposed to form three pairs of the source-side transistor and the sink-side transistor with respect to the positive electrode bar 54a and the negative electrode bar 54b. Relays 46, 47, 48 are connected to connection points of the respective pairs of the transistors in the first inverter 41. The switch 45 connects the first inverter 41 to the three-phase coils (a U-phase coil, a V-phase coil, and a W-phase coil) of the motor MG1 or the motor MG2. Three-phase coils of the motor MG2 are connected to respective connection points of the pairs of the transistors in the second inverter 42. Therefore, when the switch 45 connects the first inverter 41 to the motor MG1, the motor MG1 is driven by controlling the transistors T11 to T16 in the first inverter 41, and the motor MG2 is driven by controlling the transistors T21 to T26 in the second inverter 42. When the switch 45 connects the first inverter to the motor MG2, the motor MG2 is driven by controlling the transistors T11 to T16, and the transistors T21 to T26 so that the phases of a three-phase alternating current applied from the first inverter 41 to the motor MG2 are the same as the phases of the three-phase alternating current applied from the second inverter 42 to the motor MG2. A condenser 57 for smoothing is connected to the positive electrode bar 54a and the negative electrode bar 54b. A motor electronic control unit (hereinafter, referred to as "motor ECU") 40 controls the motors MG1 and MG2. The motor ECU 40 receives signals required for controlling the motors MG1 and MG2. For example, the motor ECU 40 receives signals from rotational position detection sensors 43 and 44 that detect rotational positions of the rotors of the motors MG1 and MG2, and signals indicating the phase currents applied to the motors MG1 and MG2, which are detected by current sensors (not shown). The motor ECU 40 outputs a switching control signal to each of the first inverter 41 and the second inverter 42. The motor ECU 40 communicates with the hybrid electronic control unit 70. The motor ECU 40 controls the motors MG1 and MG2 according to the control signal from the hybrid electronic control unit 70. In addition, the motor ECU 40 outputs data concerning the operating states of the motors MG1 and MG2 to the hybrid electronic control unit 70 as needed. The motor ECU 40 calculates rotational speeds Nm1 and Nm2 of the motors MG1 and MG2 based on the signals from the rotational position detection sensors 43 and 44.

A battery electronic control unit (hereinafter, referred to as "battery ECU") 52 controls the battery 50. The battery ECU 52 receives signals required for controlling the battery 50. For example, the battery ECU 52 receives a signal indicating a voltage between terminals from a voltage sensor (not shown) disposed between the terminals of the battery 50, a signal indicating a charge/discharge current from a current sensor (not shown) attached to an electric power line 54 connected to an output terminal of the battery 50, and a signal indicating a battery temperature Tb from a temperature sensor 51 attached to the battery 50. The battery ECU 52 outputs data concerning the state of the battery 50 to the hybrid electronic control unit 70 through communication, as needed. Also, the battery ECU 52 calculates a state of charge SOC based on an accumulation value of the charge/discharge current detected by the current sensor to control the battery 50. Also, the battery ECU 52 calculates an input limit Win of the battery 50, which is the maximum permissible electric power with which the battery 50 can be charged, and an output limit Wout of the battery 50, which is the maximum permissible electric power that can be discharged from the battery 50, based on the calculated state of charge SOC and the battery temperature Tb. The input limit Win and the output limit Wout may be set by setting basic values of the input limit Win and the output limit Wout based on the battery temperature Tb, setting an input limit correction coefficient and an output limit correction coefficient based on the state of charge SOC of the battery 50, and multiplying the set basic values of the input limit Win and the output limit Wout by the correction coefficients.

The hybrid electronic control unit 70 is configured as a microprocessor that includes a CPU 72. The hybrid electronic control unit 70 includes a ROM 74 that stores processing programs, a RAM 76 that temporarily stores data, input/output ports (not shown), and a communication port (not shown), in addition to the CPU 72. The hybrid electronic control unit 70 receives, for example, an Ignition signal from an ignition switch 80, a signal indicating a shift position SP from a shift position sensor 82 that detects an operation position of a shift lever 81, a signal indicating an accelerator pedal operation amount Acc from an accelerator pedal position sensor 84 that detects an amount of depression of ah accelerator pedal 83, a signal indicating a brake pedal position BP from a brake pedal position sensor 86 that detects an amount of depression of a brake pedal 85, a signal indicating a vehicle speed V from a vehicle speed sensor 88, and a signal indicating a road gradient θ from a gradient sensor 89, through the input port. For example, the control signal is output from the hybrid electronic control unit 70 to the switch 45 through the output port. As described above, the hybrid electronic control unit 70 is connected to the engine ECU 24, the motor ECU 40, and the battery ECU 52 through the communication port. The hybrid electronic control unit 70 transmits/receives various control signals and data to/from the engine ECU 24, the motor ECU 40, and the battery ECU 52. The position SP may be, for example, a parking position (P position), a neutral position (N position), a drive position (D position), or a reverse position (R position).

Figure 2:
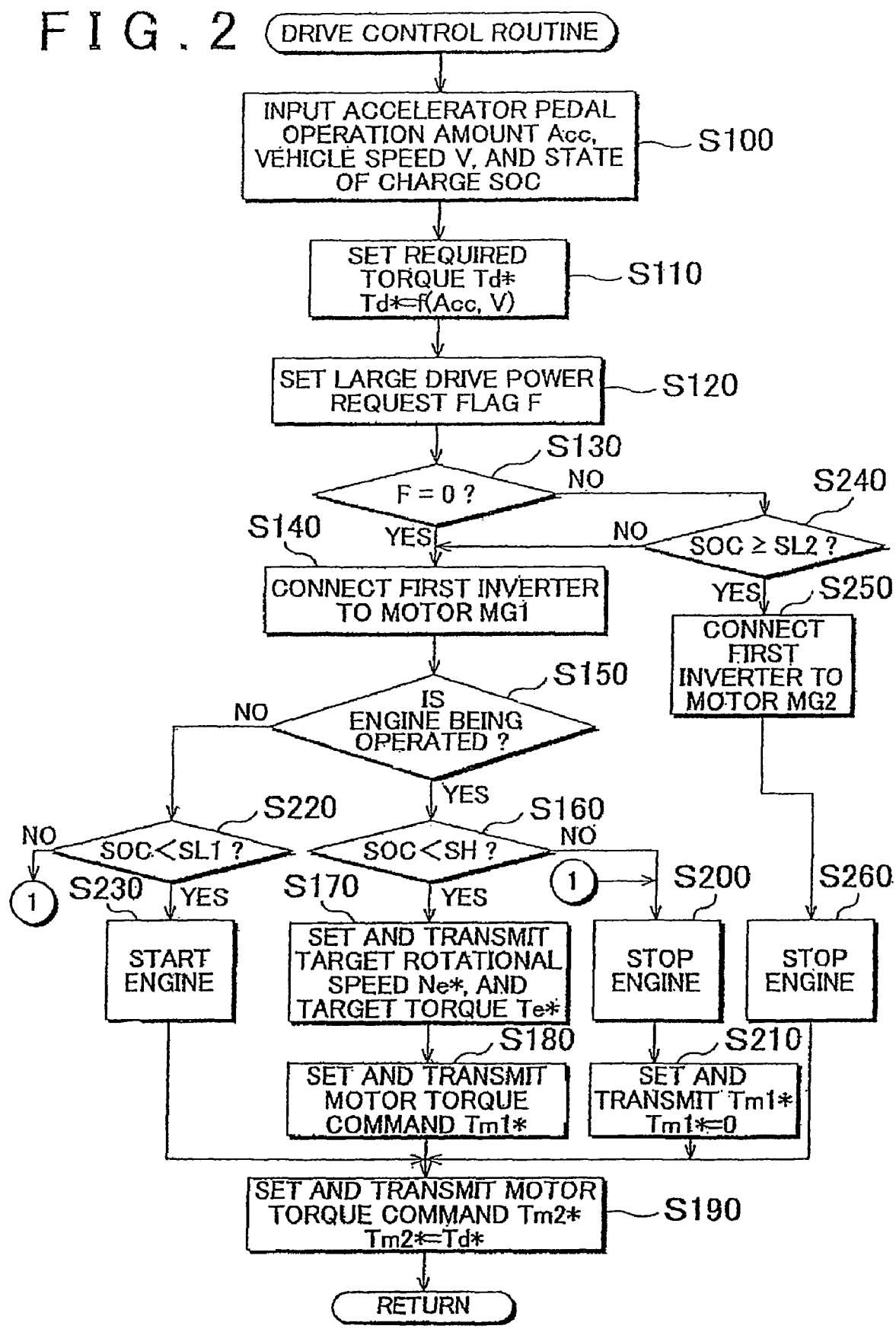
FIG. 2 is a flowchart showing a drive control routine executed by a hybrid electronic control unit according to the embodiment of the invention.

Next, operation of the hybrid vehicle 20 with the above-described configuration according to the embodiment will be described. FIG. 2 is a flowchart showing an example of a drive control routine executed by the hybrid electronic control unit 70. The routine is repeatedly executed at predetermined time intervals (for example, at intervals of several msec).

Figure 3:
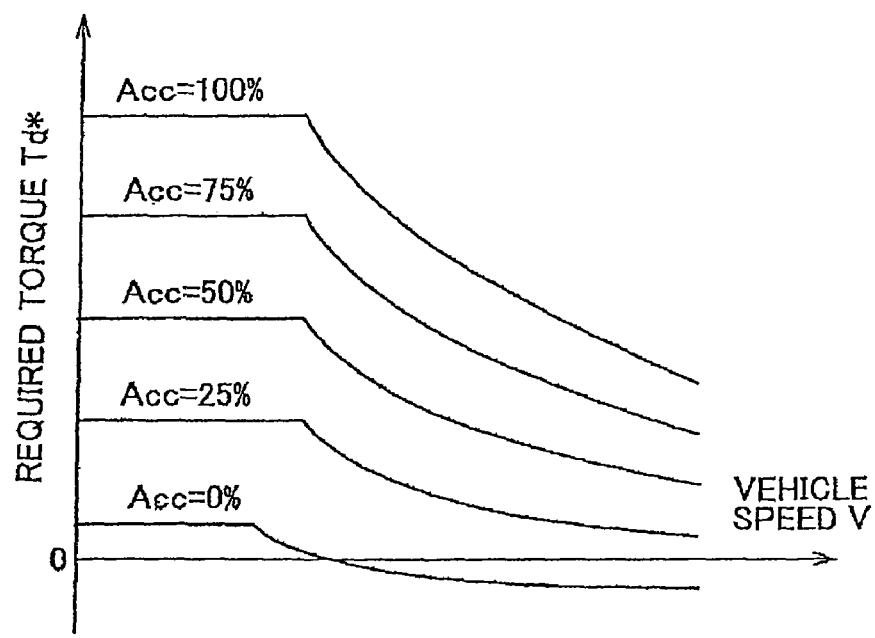
FIG. 3 is a diagram showing a required torque setting map according to the embodiment of the invention.

When the drive control routine is executed, first, the CPU 72 of the hybrid electronic control unit 70 receives the data required for the control, such as the accelerator pedal operation amount Acc from the accelerator pedal position sensor 84, the vehicle speed V from the vehicle speed sensor 88, and the state of charge SOC of the battery 50 (step S100), and sets required torque Td* that needs to be output to a drive shaft 61 connected to the drive wheels 63a and 63b (step S110). The required torque Td* is torque required for the hybrid vehicle 20, which is based on the accelerator pedal operation amount Acc and the vehicle speed V. The state of charge SOC of the battery 50, which is calculated based on the accumulation value of the charge/discharge current detected by the current sensor (not shown), is input to the CPU 72 of the hybrid electronic control unit 70 from the battery ECU 52 through communication. In the embodiment, a relation between the accelerator pedal operation amount Acc and the vehicle speed V, and the required torque Td* is defined in advance, and a torque instruction setting map indicating the relation is stored in the ROM 74. When the accelerator pedal operation amount Acc and the vehicle speed V are provided to the CPU 72 of the hybrid electronic control unit 70, the CPU 72 derives a value of the required torque Td* corresponding to the accelerator pedal operation amount Acc and the vehicle speed V from the stored map, and sets the required torque Td* to the derived value. FIG. 3 shows an example of the required torque setting map.

Next, a large drive power request flag F, which indicates whether relatively large drive power is required for travel of the hybrid vehicle 20, is set (step S120), and the value of the set large drive power request flag F is determined (step S130). When relatively large drive power is required for the travel of the hybrid vehicle 20 (for example, when the hybrid vehicle 20 is suddenly started, or when the hybrid vehicle 20 is started on an upward slope although the hybrid vehicle 20 is not suddenly started), the large drive power request flag F is set to 1. When relatively large drive power is not required for the travel of the hybrid vehicle 20, the large drive power request flag F is set to 0. In the embodiment, when the shift position SP is the D position, the accelerator pedal operation amount Acc is equal to or larger than a threshold value Acref (a value near a lower limit of a range in which it is determined that the hybrid vehicle 20 is suddenly started), the brake pedal position BP is smaller than a threshold value Bref (a value near an upper limit of a range in which it is determined that the brake pedal 85 is substantially released), and the vehicle speed V is equal to or lower than a predetermined vehicle speed Vref (a vehicle speed near an upper limit of a range in which it is determined that the hybrid vehicle 20 is substantially stopped, for example, 2 km/h), the hybrid electronic control unit 70 determines that the hybrid vehicle 20 is suddenly started. When the shift position SP is the D position, the brake pedal position BP is smaller than the threshold value Bref, the vehicle speed V is equal to or lower than the predetermined vehicle speed Vref, and the road gradient θ is equal to or larger than a predetermined gradient θref (a gradient near a lower limit of a range in which it is determined that the road is an upward slope), the hybrid electronic control unit 70 determines that the hybrid vehicle 20 is started on an upward slope. When it is determined that the hybrid vehicle 20 is suddenly started, or the hybrid vehicle 20 is started on an upward slope, the hybrid electronic control unit 70 sets the large drive power request flag F to 1. When it is determined that the hybrid vehicle 20 is not suddenly started, and the hybrid vehicle 20 is not started on an upward slope, the hybrid electronic control unit 70 sets the large drive power request flag F to 0. When the value of the large drive power request flag F is 0, the hybrid electronic control unit 70 determines that relatively large drive power is not required for the travel of the hybrid vehicle 20, and controls the switch 45 to connect the first inverter 41 to the motor MG1 (step S140).

Subsequently, the hybrid electronic control unit 70 determines whether the engine 22 is being operated (step S150). When the engine 22 is being operated, the hybrid electronic control unit 70 compares the state of charge SOC of the battery 50 with a threshold value SH (step S160). The state of charge SOC may be regarded as "the amount of charge" according to the invention. The threshold value SH is used to determine whether there is a possibility that the battery 50 may be over-charged. For example, the threshold value SH may be set to 65% or 70%. When the state of charge SOC is lower than the threshold value SH, the hybrid electronic control unit 70 determines that there is no possibility that the battery 50 may be over-charged. Thus, the hybrid electronic control unit 70 sets a target rotational speed NE* and target torque Te* for the engine 22 so that the engine 22 is operated at an operating point at which the engine 22 is efficiently operated. In addition, the hybrid electronic control unit 70 transmits the set target rotational speed NE* and the set target torque Te* to the engine ECU 24 (step S170). When the engine ECU 24 receives the target rotational speed NE* and the target torque Te*, the engine ECU 24 executes the controls for the engine 22, such as the intake air amount control, the fuel injection control, and the ignition control so that the engine 22 is operated at the operating point indicated by the target rotational Speed NE* and the target torque Te*.

Next, the hybrid electronic control unit 70 sets a torque command Tm1* for the motor MG1 to torque (−Te*) obtained by reversing the sign of the target torque Te* for the engine 22 so that the motor MG1 generates electric power using the power output from the engine 22. In addition, the hybrid electronic control unit 70 transmits the set torque command Tm1* for the motor MG1 to the motor ECU 40 (step S180). Then, the hybrid electronic control unit 70 sets a torque command Tm2* for the motor MG2 to the required torque Td*, and transmits the set torque command Tm2* for the motor MG2 to the motor ECU 40 (step S190). Thus, the drive control routine ends. When the motor ECU 40 receives the torque commands Tm1* and Tm2*, the motor ECU 40 executes a switching control for switching elements of the first inverter 41 and the second inverter 42 so that the motor MG1 is driven according to the torque command Tm1*, and the motor MG2 is driven according to the torque command Tm2*. By executing the control, the engine 22 is efficiently operated, the motor MG1 generates the electric power, and the motor MG2 outputs the required torque Td* to the drive shaft 61 so that the hybrid vehicle 20 travels.

When the state of charge SOC is equal to or higher than the threshold value SH in step S160, there is a possibility that the battery 50 may be over-charged. Therefore, the hybrid electronic control unit 70 determines that the engine 22 should be stopped to stop the power generation performed by the motor MG1, and transmits the control signal that stops the engine 22 to the engine ECU 24 (step S200). Also, the hybrid electronic control unit 70 sets the torque command Tm1* for the motor MG1 to 0, and transmits the torque command Tm1* to the motor ECU 40 (step S210). Also, the hybrid electronic control unit 70 sets the torque command Tm2* for the motor MG2 to the required torque Td*, and transmits the torque command Tm2* to the motor ECU 40 (step S190). Thus, the drive control routine ends. When the engine ECU 24 receives the control signal that stops the engine 22, the engine ECU 24 stops fuel injection from a fuel injection valve, and stops ignition performed by an ignition plug.

When it is determined that the engine 22 is not being operated, that is, the engine 22 is stopped in step S150, the hybrid electronic control unit 70 compares the state of charge SOC of the battery 50 with a threshold value SL1 (step S220). The threshold value SL1 is used to determine whether the engine 22 should be started. For example, the threshold value SL1 may be 40% or 45%. When the state of charge SOC is equal to or higher than the threshold value SL1, the hybrid electronic control unit 70 determines that the engine 22 does not need to be started. Thus, the hybrid electronic control unit 70 executes processes in step S200 and subsequent steps, and ends the drive control routine.

When the state of charge SOC is lower than the threshold value SL1 in step S220, the hybrid electronic control unit 70 determines that the engine 22 should be started. Thus, the hybrid electronic control unit 70 transmits the control signal that starts the engine 22 to the motor ECU 40 and the engine ECU 24, thereby starting the engine 22 (step S230). Also, the hybrid electronic control unit 70 sets the torque command Tm2* for the motor MG2 to the required torque Td*, and transmits the set torque command Tm2* to the motor ECU 40 (step S190). Thus, the drive control routine ends. When the motor ECU 40 receives the control signal that starts the engine 22, the motor ECU 40 controls the motor MG1 to operate the engine 22 using the motor MG1. When the engine 22 receives the control signal that starts the engine 22, the engine ECU 24 starts the fuel injection and the ignition at a time point at which the rotational speed Ne of the engine 22 reaches a threshold value Nref, thereby starting the engine 22. After the process of starting the engine 22 is completed, the engine 22 is operated at the operating point at which the engine 22 is efficiently operated, and the motor MG1 generates the electric power as described above, when the routine is executed at next and subsequent times.

When the value of the large drive power request flag F is 1 in step S130, the hybrid electronic control unit 70 determines that relatively large drive power is required for the travel of the hybrid vehicle 20, and therefore, the hybrid electronic control unit 70 compares the state of charge SOC of the battery 50 with a threshold value SL2 that is equal to or lower than the threshold value SL1 (step S240). The threshold value SL2 is used to determine whether there is a possibility that the battery 50 may be over-discharged. In the embodiment, the threshold value SL2 is equal to the threshold value SL1. When the state of charge SOC is lower than the threshold value SL2, there is a possibility that the battery 50 may be over-discharged, and therefore, the hybrid electronic control unit 70 determines that the engine 22 should be operated so that the motor MG1 generates the electric power. Thus, the hybrid electronic control unit 70 controls the switch 45 to connect the first inverter 41 to the motor MG1 (step S140), and executes the processes in step S150 and subsequent steps. Thus, the drive control routine ends. In this case, when the engine 22 is being operated, the engine 22 continues to be operated, and the motor MG1 generates the electric power. When the engine 22 is not being operated, the engine 22 is started.

When the state of charge SOC is equal to or higher than the threshold value SL2 in step S240, the hybrid electronic control unit 70 determines that relatively large drive power is required for the travel of the hybrid vehicle 20, and there is no possibility that the battery 50 may be over-discharged. Thus, the hybrid electronic control unit 70 controls the switch 45 to connect the first inverter 41 to the motor MG2 (step S250), and transmits the control signal that stops the engine 22 to the engine ECU 24 to stop the engine 22 (step S260). Also, the hybrid electronic control unit 70 sets the torque command Tm2* for the motor MG2 to the required torque Td*, and transmits the set torque command Tm2* for the motor MG2 to the motor ECU 40 (step S190). Thus, the drive control routine ends. When the motor ECU 40 receives the torque command Tm2*, the motor ECU 40 executes the switching control for the switching elements of the first inverter 41 and the second inverter 42 so that the phases of the three-phase alternating current applied from the first inverter 41 to the motor MG2 are the same as the phases of the three-phase alternating current applied from the second inverter 42 to the motor MG2, and the motor MG2 is driven according to the torque command Tm2*. In the embodiment, when relatively large drive power is required of the motor MG2, and the state of charge SOC is equal to or higher than the threshold value SL2, large drive power is output from the motor MG2 by driving the motor MG2 using the first inverter 41 and the second inverter 42, as compared to when the motor MG2 is driven by only the second inverter 42. In this case, it is not possible to generate the electric power using the power from the engine 22. Thus, by switching the connection state of the first inverter 41 according to the drive power required for the travel of the hybrid vehicle 20, it is possible to drive the motor MG2 using the second inverter 42 that has lower performance than that of an inverter that can supply, by itself, the electric power corresponding to the rated maximum output of the motor MG2.

In the above-described hybrid vehicle 20 in the embodiment, when relatively large drive power is required for the travel of the hybrid vehicle 20, the switch 45 connects the first inverter 41 to the motor MG2, and therefore, the motor MG2 is driven using the first inverter 41 and the second inverter 42 so that the motor MG2 outputs the required torque Td* to the drive shaft 61. Thus, large drive power is output from the motor MG2, as compared to when the motor MG2 is driven by only the second inverter 42. That is, by switching the connection state of the first inverter 41 according to the drive power required for the travel of the hybrid vehicle 20, it is possible to drive the motor MG2 using the second inverter 42 that has lower performance than that of an inverter that can supply, by itself, the electric power corresponding to the rated maximum output of the motor MG2.

In the hybrid vehicle 20 in the embodiment, when the switch 45 connects the first inverter 41 to the motor MG2, the engine 22 is stopped. However, the engine 22 may autonomously operate at an idling speed.

In the hybrid vehicle 20 in the embodiment, for example, the large drive power request flag F is set based on the road gradient θ detected by the gradient sensor 89. However, an acceleration sensor, which detects acceleration in a longitudinal direction of the vehicle, may be provided, and the road gradient θ may be calculated based on, for example, a value detected by the acceleration sensor. Also, in a vehicle that receives a position of the vehicle from a GPS satellite when the vehicle travels, the road gradient θ may be determined based on the position of the vehicle received from the GPS satellite.

In the hybrid vehicle 20 in the embodiment, for example, when the hybrid vehicle 20 is suddenly started, or the hybrid vehicle 20 is started on an upward slope although the hybrid vehicle 20 is not suddenly started, it is determined that relatively large drive power is required for the travel of the hybrid vehicle 20. However, when the road gradient is equal to of larger than a predetermined gradient, it may be determined that relatively large drive power is required for the travel of the hybrid vehicle 20, regardless of the travel state of the hybrid vehicle 20. Also, when the hybrid vehicle 20 is started, it may be determined that relatively large drive power is required for the travel of the hybrid vehicle 20, regardless of the road gradient, and regardless of whether the hybrid vehicle 20 is suddenly started. Also, instead of, or in addition to these configurations, when the hybrid vehicle 20 is suddenly accelerated, it may be determined that relatively large drive power is required for the travel of the hybrid vehicle 20.

Figure 4:
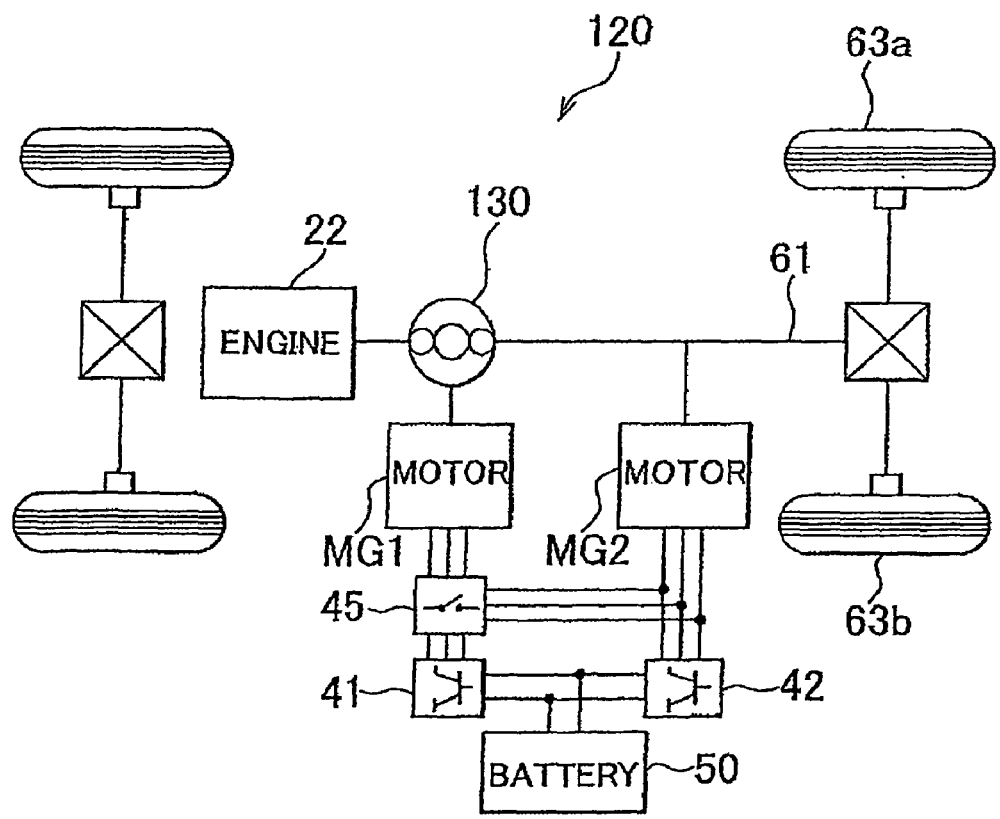
FIG. 4 is a diagram schematically showing a configuration of a hybrid vehicle in a modified example of the embodiment of the invention.

In the embodiment, the invention is applied to the hybrid vehicle 20 in which the battery 50 is charged with the electric power generated by the motor MG1 using all the power from the engine 22, and the motor MG2 outputs power for the travel of the hybrid vehicle 20 using the electric power from the battery 50 and the motor MG1. That is, in the embodiment, the invention is applied to the so-called series hybrid vehicle. However, the invention may be applied to a vehicle that includes the engine 22 that outputs power to the drive wheels 63a and 63b through a planetary gear mechanism 130; the motor MG1; and the motor MG2 that outputs power to the drive wheels 63a and 63b as well as the engine 22. That is, the invention may be applied to, for example, a hybrid vehicle 120 in a modified example shown in FIG. 4.

In the embodiment, the engine 22 may be regarded as "the internal combustion engine". The motor MG1 may be regarded as "the power generator". The motor MG2 may be regarded as "the motor". The battery 50 may be regarded as "the electric power storage device". The second inverter 42 may be regarded as "the first inverter". The first inverter 41 may be regarded as "the second inverter". The switch 45 may be regarded as "the connection switching device". The hybrid electronic control unit 70, which executes the process in step S110 in the drive control routine in FIG. 2 to set the required torque Td* based on the accelerator pedal operation amount Acc and the vehicle speed V, may be regarded as "the required drive power setting portion". The hybrid electronic control unit 70, which executes the process in step S120 in the drive control routine in FIG. 2 to set the large drive power request flag F based on the shift position SP, the accelerator pedal operation amount Acc, the brake pedal position BP, the vehicle speed V, the road gradient θ, and the like, may be regarded as "the large drive power determination portion". The hybrid electronic control unit 70, the engine ECU 24, and the motor ECU 40 may be regarded as "the control device". The hybrid electronic control unit 70 executes the drive control routine in FIG. 2. That is, when relatively large drive power is not required for the travel of the hybrid vehicle, the hybrid electronic control unit 70 controls the switch 45 to connect the first inverter 41 to the motor MG1, sets the control signal for the engine 22 and transmits the control signal to the engine ECU 24, and sets the torque commands Tm1* and Tm2* and transmits the torque commands Tm1* and Tm2* to the motor ECU 40 so that the required torque Td* required for the travel of the hybrid vehicle is output to the drive shaft 61 while the engine 22 is intermittently operated, and the motor MG1 generates the electric power using the power output from the engine 22. When relatively large drive power is required for the travel of the hybrid vehicle, the hybrid electronic control unit 70 controls the switch 45 to connect the first inverter 41 to the motor MG2, sets the control signal and transmits the control signal to the engine ECU 24, and sets the torque command Tm2* for the motor MG2 and transmits the torque command Tm2* to the motor ECU 40 so that the required torque Td* required for the travel of the hybrid vehicle is output to the drive shaft 61 while the engine 22 is in a stopped state. The engine ECU 24 controls the engine 22 based on the control signal from the hybrid electronic control unit 70. When relatively large drive power is not required for the travel of the hybrid vehicle, the motor ECU 40 controls the first inverter 41 and the second inverter 42 so that the motor MG1 is driven by the first inverter 41 and the motor MG2 is driven by the second inverter 42 based on the torque commands Tm1* and Tm2*. When relatively large drive power is required for the travel of the hybrid vehicle, the motor ECU 40 controls the first inverter 41 and the second inverter 42 so that the motor MG2 is driven by the first inverter 41 and the second inverter 42 based on the torque command Tm2*.

"The internal combustion engine" is not limited to the internal combustion engine that outputs power using hydrocarbon fuel such as gasoline or light oil. Any internal combustion engine, such as a hydrogen engine, may be employed as "the internal combustion engine". "The power generator" is not limited to the motor MG1 that is configured as a synchronous generator/motor. Any motor, such as an induction motor, may be employed as "the power generator", as long as the motor generates electric power using the power from the internal combustion engine. "The motor" is riot limited to the motor MG2 configured as a synchronous generator/motor. Any motor, such as an induction motor, may be employed as "the motor", as long as the motor outputs power for the travel of the hybrid vehicle. "The electric power storage device" is not limited to the battery 50 that is a secondary battery. Any electric power storage device, such as a capacitor, may be employed as "the electric power storage device", as long as the electric power storage device is charged with electric power, and the electric power is discharged from electric power storage device. "The first inverter" is not limited to the second inverter 42. Any device may be employed as "the first inverter", as long as the device is connected to the electric power storage device and the motor, and the device drives the motor. "The second inverter" is not limited to the first inverter 41. Any device may be employed as "the second inverter", as long as the device is connected to the electric power storage device and the power generator or the motor, and the device drives the power generator or the motor. "The connection switching device" is hot limited to the switch 45. Any device may be employed as "the connection switching device", as long as the device switches a connection state of the second inverter between a connection state in which the second inverter is connected to the power generator, and a connection state in which the second inverter is connected to the motor. "The required drive power setting portion" is not limited to the portion that sets the required torque Td* based on the accelerator pedal operation amount Acc and the vehicle speed V. Any portion may be employed as "the required drive power setting portion", as long as the portion sets the required torque required for the drive shaft. For example, the portion that sets the required torque based on only the accelerator pedal operation amount Acc may be employed as "the required drive power setting portion". Alternatively, the portion that sets the required torque based on the position of the vehicle in a travel route may be employed as "the required drive power setting portion" in the case where the travel route is set in advance. "The large drive power determination portion" is not limited to the portion that sets the large drive power request flag F based on the shift position SP, the accelerator pedal operation amount Acc, the brake pedal position BP, the vehicle speed V, the rotational speed Nm2 of the motor MG2, the road gradient θ, and the like. Any portion may be employed as "the large drive power determination portion", as long as the portion determines whether the hybrid vehicle is in the large-drive-power required state in which drive power equal to or larger than a predetermined value is required for the travel of the hybrid vehicle. "The control device" is not limited to the combination of the hybrid electronic control unit 70, the engine ECU 24, and the motor ECU 40. A single electronic control unit may be employed as "the control device". Also, "the control device" is not limited to the device which controls the switch 45 to connect the first inverter 41 to the motor MG1, and controls the engine 22, the first inverter 41, and the second inverter 42 so that the required torque Td* required for the travel of the hybrid vehicle is output to the output shaft 61 while the engine 22 is intermittently operated, and the motor MG1 generates the electric power using the power output from the engine 22, when relatively large drive power is not required, and which controls the switch 45 to connect the first inverter 41 to the motor MG2, and controls the engine 22, the first inverter 41, and the second inverter 42 so that the required torque Td* required for the travel of the hybrid vehicle is output to the output shaft 61 while the engine 22 is in a stopped, state, when relatively large drive power is required for the travel of the hybrid vehicle. Any device may be employed as "the control device", as long as the device controls the internal combustion engine, the first inverter, the second inverter, and the connection switching device so that the hybrid vehicle travels using the set required drive power while the second inverter is connected to the power generator, when the large drive power determination device determines that the hybrid vehicle is hot in the large-drive-power required state, and the device controls the internal combustion engine, the first inverter, the second inverter, and the connection switching device so that the hybrid vehicle travels using the set required drive power while the second inverter is connected to the motor, when the large drive power determination portion determines that the hybrid vehicle is in the large-drive-power required state.

While the invention has been described with reference to example embodiments thereof, it is understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

The invention may be used in vehicle manufacturing industry.

What is claimed is:

1. A hybrid vehicle comprising:
    an internal combustion engine;
    a power generator that generates electric power using power from the internal combustion engine;
    a motor that outputs power for travel of the hybrid vehicle;
    an electric power storage device which is charged with the electric power, and from which the electric power is discharged;
    a first inverter that is connected to the electric power storage device and the motor, and that drives the motor;
    a second inverter connected to the electric power storage device;
    a connection switching device that switches a connection state of the second inverter between a connection state in which the second inverter connected to the power generator, and a connection state in which the second inverter is connected to the motor;
    a required drive power setting portion that sets required drive power required for the travel of the hybrid vehicle;
    a large drive power determination portion that determines whether the hybrid vehicle is in a large-drive-power required state in which drive power equal to or larger than a predetermined value is required for the travel of the hybrid vehicle; and
    a control device which controls the internal combustion engine, the first inverter, the second inverter, and the connection switching device so that the hybrid vehicle travels using the set required drive power while the second inverter is connected to the power generator, when the large drive power determination device determines that the hybrid vehicle is not in the large-drive-power required state, and which controls the internal combustion engine, the first inverter, the second inverter, and the connection switching device so that the hybrid vehicle travels using the set required drive power while the second inverter is connected to the motor, when the large drive power determination device determines that the hybrid vehicle is in the large-drive-power required state.

2. The hybrid vehicle according to claim 1, wherein when the large drive power determination portion determines that the hybrid vehicle is in the large-drive-power required state, the control device controls the first inverter so that a three-phase alternating current is applied from the first inverter to the motor; and controls the second inverter so that a three-phase alternating current is applied from the second inverter to the motor.

3. The hybrid vehicle according to claim 2, wherein the control device controls the internal combustion engine, the first inverter, the second inverter, and the connection switching device so that phases of the three-phase alternating current applied from the first inverter to the motor are the same as phases of the three-phase alternating current applied from the second inverter to the motor.

4. The hybrid vehicle according to claim 1, wherein when the hybrid vehicle is started, the large drive power determination portion determines that the hybrid vehicle is in the large-drive-power required state.

5. The hybrid vehicle according to claim 4, wherein when a road gradient is equal to or larger than a predetermined gradient, the large drive power determination portion determines that the hybrid vehicle is in the large-drive-power required state.

6. The hybrid vehicle according to claim 1, wherein:
    the first inverter is electrically connected to the electric power storage device and the motor, and the second inverter is electrically connected to the electric power storage device;
    when the second inverter is connected to the power generator, the second inverter is electrically connected to the power generator; and
    when the second inverter is connected to the motor, the second inverter is electrically connected to the motor.

7. A method of controlling a hybrid vehicle that includes an internal combustion engine; a power generator that generates electric power using power from the internal combustion engine; a motor that outputs power for travel of the hybrid vehicle; an electric power storage device which is charged with the electric power, and from which the electric power is discharged; a first inverter that is connected to the electric power storage device and the motor, and that drives the motor; a second inverter connected to the electric power storage device; and a connection switching device that switches a connection state of the second inverter between a connection state in which the second inverter is connected to the power generator, and a connection state in which the second inverter is connected to the motor, the method comprising:

determining whether the hybrid vehicle is in a large-drive-power required state in which drive power equal to or larger than a predetermined value is required for the travel of the hybrid vehicle; and controlling the internal combustion engine, the first inverter, the second inverter, and the connection switching device so that the hybrid vehicle travels using required drive power required for the travel of the hybrid vehicle while the second inverter is connected to the power generator, when it is determined that the hybrid vehicle is not in the large-drive-power required state; and controlling the internal combustion engine, the first inverter, the second inverter, and the connection switching device so that the hybrid vehicle travels using the required drive power required for the travel of the hybrid vehicle while the second inverter is connected to the motor, when it is determined that the hybrid vehicle is in the large-drive-power required state.

8. The method according to claim 7, wherein when it is determined that the hybrid vehicle is in the large-drive-power required state, the internal combustion engine, the first inverter, the second inverter, and the connection switching device are controlled so that a three-phase alternating current is applied from the first inverter to the motor, a three-phase alternating current is applied from the second inverter to the motor, and phases of the three-phase alternating current applied from the first inverter to the motor are the same as phases of the three-phase alternating current applied from the second inverter to the motor.

9. The method according to claim 8, further comprising:
detecting an amount of charge of the electric power storage device; and
applying the three-phase alternating current from the second inverter to the motor, when it is determined that the hybrid vehicle is in the large-drive-power required state, and the amount of charge is larger than a predetermined amount.

10. The method according to claim 9, further comprising stopping the internal combustion engine, when it is determined that the hybrid vehicle is in the large-drive-power required state, and the amount of charge is larger than the predetermined amount.

11. The method according to claim 7, wherein the method of controlling the hybrid vehicle is repeatedly executed at predetermined time intervals.

12. A hybrid vehicle comprising:
an internal combustion engine;
a power generator that generates electric power using power from the internal combustion engine;
a motor that outputs power for travel of the hybrid vehicle;
an electric power storage device which is charged with the electric power, and from which the electric power is discharged;
a first inverter that is electrically connected to the electric power storage device and the motor, and that drives the motor;
a second inverter electrically connected to the electric power storage device; and
a connection switching device that switches a connection state of the second inverter between a connection state in which the second inverter is electrically connected to the power generator, and a connection state in which the second inverter is electrically connected to the motor.

13. The hybrid vehicle according to claim 12, wherein when the second inverter is electrically connected to the electric power storage device and the motor, the first inverter is electrically connected to the electric power storage device and the motor.

14. The hybrid vehicle according to claim 12, further comprising:
a large drive power determination portion that determines whether drive power equal to or larger than a predetermined value is required for the travel of the hybrid vehicle; and
a control device which controls the connection switching device so that the second inverter is electrically connected to the power generator, when the large drive power determination device determines that the hybrid vehicle is not in the large-drive-power required state, and which controls the connection switching device so that the second inverter is electrically connected to the motor, when the large drive power determination device determines that the hybrid vehicle is in the large-drive-power required state.

15. A hybrid vehicle comprising:
an internal combustion engine;
a power generator that generates electric power using power from the internal combustion engine;
a motor that outputs power for travel of the hybrid vehicle;
electric power storage means which is charged with the electric power, and from which the electric power is discharged;
a first inverter that is connected to the electric power storage means and the motor, and that drives the motor;
a second inverter connected to the electric power storage means;
connection switching means for switching a connection state of the second inverter between a connection state in which the second inverter is connected to the power generator, and a connection state in which the second inverter is connected to the motor;
required drive power setting means for setting required drive power required for the travel of the hybrid vehicle;
large drive power determination means for determining whether the hybrid vehicle is in a large-drive-power required state in which drive power equal to or larger than a predetermined value is required for the travel of the hybrid vehicle; and
control means for controlling the internal combustion engine, the first inverter, the second inverter, and the connection switching means so that the hybrid vehicle travels using the set required drive power while the second inverter is connected to the power generator, when the large drive power determination means determines that the hybrid vehicle is not in the large-drive-power required state, and for controlling the internal combustion engine, the first inverter, the second inverter, and the connection switching means so that the hybrid vehicle travels using the set required drive power while the second inverter is connected to the motor, when the large drive power determination means determines that the hybrid vehicle is in the large-drive-power required state.

* * * * *